United States Patent [19]
Riddell et al.

[11] 4,270,943
[45] Jun. 2, 1981

[54] ROTARY FIBER FORMING SPINNER

[75] Inventors: John M. Riddell, Newark, Ohio; William W. Schultz, Evanston, Ill.

[73] Assignee: Owens-Corning Fiberglas Corporation, Toledo, Ohio

[21] Appl. No.: 109,006

[22] Filed: Dec. 31, 1979

[51] Int. Cl.³ .............................................. C03B 37/04
[52] U.S. Cl. ............................................ 65/15; 65/8; 425/7; 425/8; 264/8; 264/12
[58] Field of Search ........................................ 65/6–8, 65/14–16; 425/7, 8; 264/8, 12

[56] References Cited

U.S. PATENT DOCUMENTS

| | | | |
|---|---|---|---|
| 2,936,479 | 5/1960 | Morrison | 65/15 X |
| 2,980,954 | 4/1961 | Levecque et al. | 65/15 |
| 3,238,029 | 3/1966 | Cullen | 65/15 |
| 3,250,602 | 5/1966 | Stalego | 65/8 |
| 3,393,986 | 7/1968 | Firnhaber | 65/8 |
| 3,622,293 | 11/1971 | Firnhaber | 65/6 |

FOREIGN PATENT DOCUMENTS 241859  9/1960  Australia ................................ 65/15

*Primary Examiner*—Robert L. Lindsay, Jr.
*Attorney, Agent, or Firm*—Ronald C. Hudgens; Philip R. Cloutier; Ted C. Gillespie

[57] ABSTRACT

A spinner for the production of molten glass fibers is disclosed. The spinner is adapted with a plurality of projections affixed to the spinner bottom and extending inwardly of the spinner. The projections are intended to inhibit inward flow towards the spinner support and aid wetting of the inner bottom surface of the spinner.

4 Claims, 6 Drawing Figures

ROTARY FIBER FORMING SPINNER

This invention pertains to a rotary fiber forming spinner.

In one of its more specific aspects, this invention relates to an improved spinner for the production of glass fibers by the rotary process.

The production of glass fibers by means of the rotary process is well known. In general, molten glass is fed into a spinner which revolves at high speeds. The spinner has a solid lower surface and a circumferential wall containing a multiplicity of apertures. The glass, which enters near the center of the spinner is thrown by centrifugal force through the apertures of the circumferential wall in the form of small diameter fibers. These fibers are collected on a collecting surface as a mat which receives subsequent treatment depending upon the nature of the product to be produced therefrom.

The molten glass introduced into the spinner can act in various ways due to its composition and the temperature conditions under which it is introduced.

A problem encountered upon introduction is that the glass stream does not quickly wet the inner bottom surface of the spinner. One result encountered is that the glass stream wraps around the rotating spinner support, effecting an interruption in the issue of glass through the circumferential wall. Another result encountered is that the glass fails to uniformly wet the inner bottom surface of the spinner with the result that excessive vibrations of the high speed spinner occur. These vibrations lead to the ultimate failure of the spinner. A third result encountered is the misalignment of the glass stream with the introductory conduit which occasions either the interruption of the issue of glass or the excessive vibration already mentioned. The apparatus of this invention is directed towards the solution of the underlying problem.

STATEMENT OF THE INVENTION

According to this invention there is provided a spinner comprising an apertured circumferential wall and a bottom wall, the bottom wall being adapted with a plurality of inwardly-extending projections.

Any inward projection which aids wetting of the spinner inner bottom surface and acts to form a barrier to the inward flow of glass away from the outer circumferential wall and which creates a flow path extending outwardly from the glass introductory locus is within the scope of this invention.

In one of its embodiments, the inwardly-extending projections define a series of convolutions extending outwardly from the center of the spinner to the outer wall.

In another of its embodiments, the inwardly-extending projections define a plurality of circular rows of discontinuous projections, the projections of any one row alternately spaced in relation to the projections of the next adjacent row.

In another of its embodiments, the inwardly-extending projections define a series of adjacent flow paths opening from the locus at which glass is introduced into the spinner, the segments increasing in width as they approach the circumferential wall of the spinner.

In another of its embodiments, the inwardly-extending projections impart a uniform random irregularity to the inner bottom surface of the spinner.

DESCRIPTION OF DRAWINGS

The invention will be more easily understood if explained in conjunction with the attached drawings in which:

Referring now to FIGS. 1 and 2, there is shown spinner 10 having upper wall 11, apertured circumferential wall 12, and bottom wall 13. The spinner will be affixed to a member entering the spinner through port 14 and attached to support means 15. Glass introduction will be made by conduit means, not shown, through port 14, at approximately locus 16.

Referring now to FIG. 3, there is shown positioned on bottom wall 13 a series of inwardly-extending projections 17 which define a series of convolute paths 18 extending outwardly from approximately the center of the spinner to the outer wall. These projections are positioned such that their convex edge is the leading edge upon rotation. Any number of paths can be employed.

Referring now to FIG. 4, there is shown positioned on the bottom wall 13 a series of intermittently spaced protrusions 20 arranged circumferentially with respect to support means 15. These projections are arranged in circumferential rows 21 such that the projections in any one row are placed opposite an opening 22 between the projections of the next adjacent rows. Any number of rows of projections can be employed.

Referring now to FIG. 5, there is shown positioned on the bottom wall 13 a series of projections 30 which form a plurality of paths 31 therebetween. These projections are in the form of truncated pyramids with outwardly curved bases adjacent the spinner wall and occupy a sufficient portion of the area of the bottom wall so as to significantly reduce the flow areas provided by the paths. In this manner, the flow velocity of the glass to the circumferential wall is substantially increased.

In these first three instances, the extent to which the projections rise above the bottom wall can be any reasonable height. In all instances, it is desired to aid wetting of the spinner inner bottom surface and to create flow channels. Generally, a projection height of from about 0.05 inch to about 0.50 inch is adequate.

Figure 1:
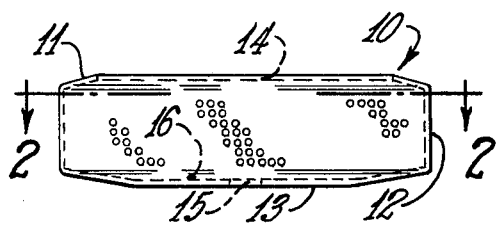
FIG. 1 is a elevational view of a spinner of this invention.
Figure 2:
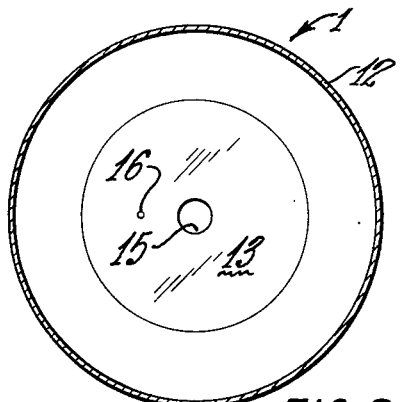
FIG. 2 is a plan view of a spinner through section 2—2 of FIG. 1.
Figure 3:
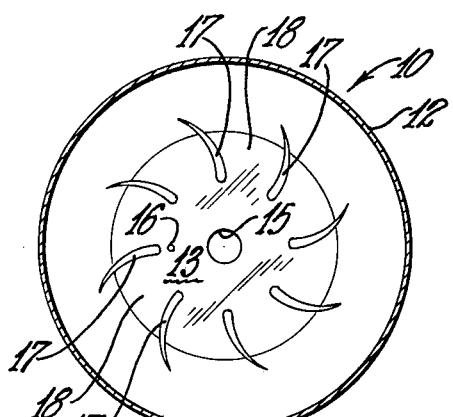
FIGS. 3, 4, 5 and 6 are modifications of the bottom wall of FIG. 2, these modifications illustrating the configuration of various inward projections within the scope of this invention.
Figure 4:
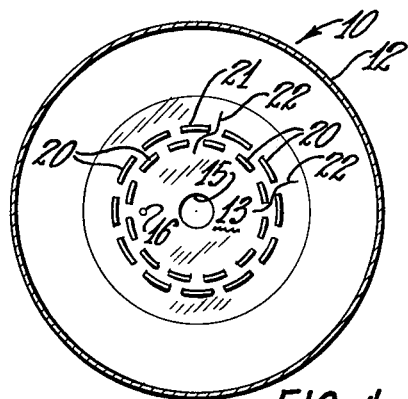
Figure 5:
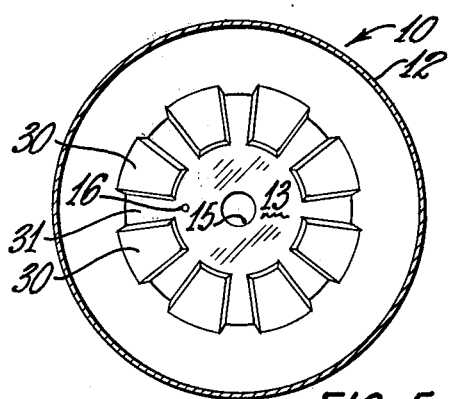
Figure 6:
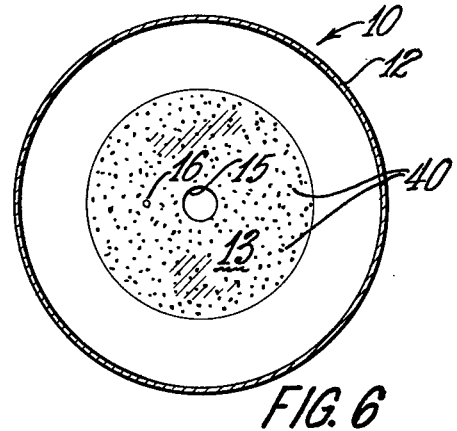

Referring now to FIG. 6, there is shown positioned on the bottom wall 13 a uniform distribution of irregularities 40 creating a random surface roughness. In this instance it is desired to directly accelerate wetting of the inner bottom surface of the spinner. Specifically, a roughness greater than that imparted by standard sand casting is necessary, and a roughness of from about 2000 microinches to 4000 microinches arithmetical average deviation from the mean surface as measured by a Profilometer or Brush Surface Analyzer is generally adequate.

The number of projections which are employed will be dependent upon the distribution of the glass as it issues through the circumferential wall. In no instance will the number and positioning of the projections be such that glass issuance through the circumferential wall is unevenly distributed among the apertures. Similarly, in no instance will the number and positioning of the projections be such that the flow through the apertures is impeded to the extent that spinner capacity becomes less than that attainable in the absence of such projections.

It will be evident from the foregoing that various modifications can be made to the method of this invention. Such, however, are considered within the scope of this invention.

We claim:

1. A spinner for the centrifugal production of fibers comprising an apertured circumferential wall and a bottom wall, the bottom wall being adapted with a plurality of inwardly-extending projections defining a series of convolutions extending outwardly from the center of the spinner, said convolutions having convolute paths therebetween, said convolutions having a convex edge which forms a leading edge of said projection upon rotation of said spinner.

2. A spinner for the centrifugal production of fibers comprising an apertured circumferential wall, a bottom wall and a centrally positioned support means, being adapted with a plurality of circular rows of discontinuous projections, said rows being positioned circumferential to said support means, the projections of any one row being alternately spaced in relation to the projections of the next adjacent row.

3. A spinner for the centrifugal production of fiber comprising an apertured circumferential wall, a bottom wall and a centrally positioned support means, the bottom wall being adapted with a plurality of projections in the form of truncated pyramids, having outwardly curved bases and forming a plurality of paths therebetween.

4. The spinner of claim 3 in which said pyramids have outwardly curved bases adjacent said circumferential wall.

* * * * *